United States Patent [19]

Gilby

[11] 3,726,598
[45] Apr. 10, 1973

[54] MULTIPLE PASS OPTICAL ABSORPTION CELL

[75] Inventor: Anthony C. Gilby, Darien; James Alan Horton, Trumbull, both of Conn.

[73] Assignee: Wilks Scientific Corporation, South Norwalk, Conn.

[22] Filed: Feb. 14, 1972

[21] Appl. No.: 225,858

[52] U.S. Cl. ............................... 356/244, 356/51
[51] Int. Cl. ..................... G01n 21/16, G01n 21/36
[58] Field of Search................ 356/244, 246, 51; 350/293; 330/4.3

[56] References Cited

UNITED STATES PATENTS 3,518,001  6/1970  Hell.................................356/244

Primary Examiner—Ronald L. Wibert
Assistant Examiner—Conrad Clark
Attorney—Garold E. Bramblett, Jr. et al.

[57] ABSTRACT

A multiple pass optical absorption cell of the type having a pair of objective mirrors and a field mirror, all having substantially the same radius of curvature and with the entrance and exit windows positioned to one side of the field mirror. In this invention, the two objective mirrors are positioned on a common mount with a fixed predetermined distance separating their centers of curvature. Path length is changed by rotation of the common mount, whereby the distance between the centers of curvature remains fixed.

The foregoing abstract is not to be taken either as a complete exposition or as a limitation of the present invention, and in order to understand the full nature and extent of the technical disclosure of this application, reference must be had to the following detailed description and the accompanying drawings as well as to the claims.

10 Claims, 7 Drawing Figures

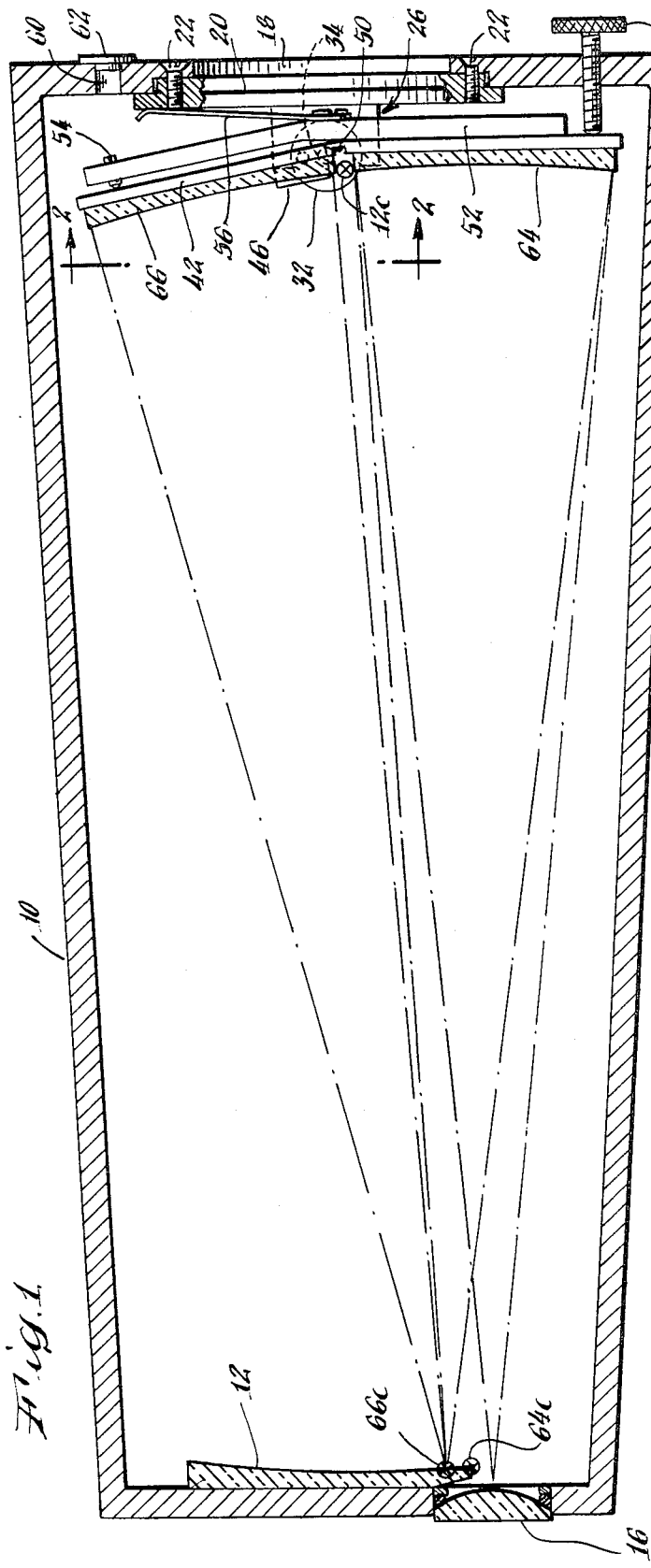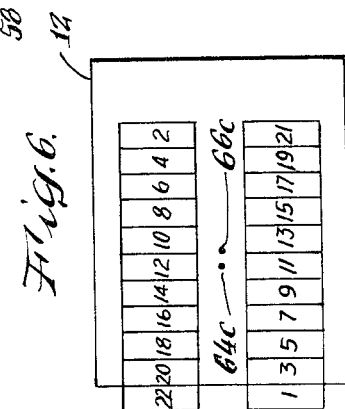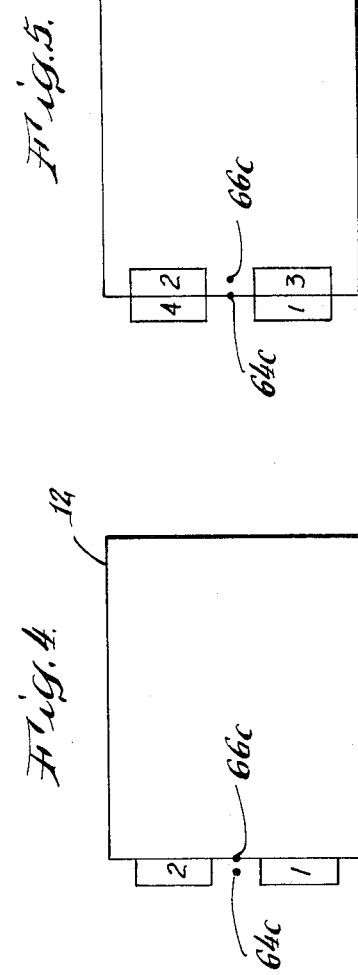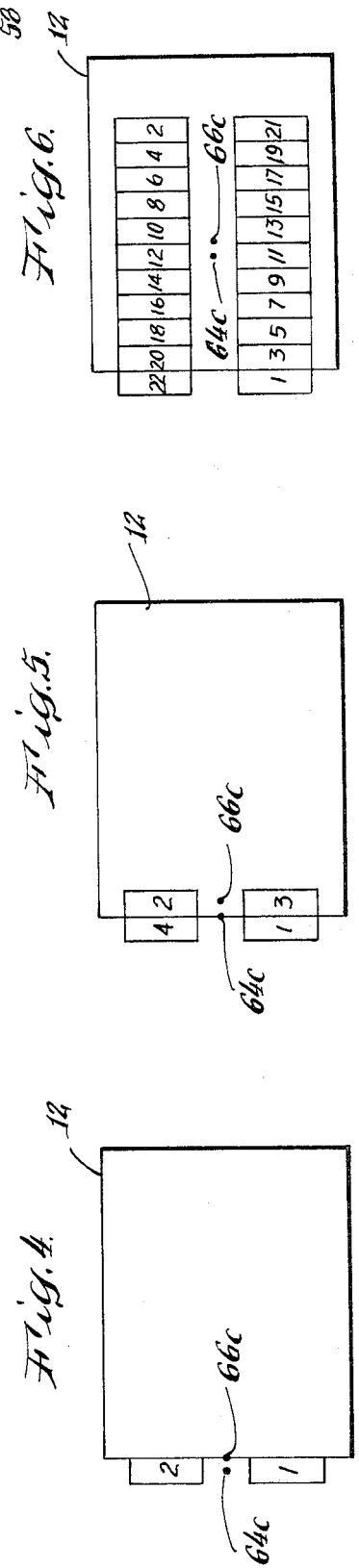

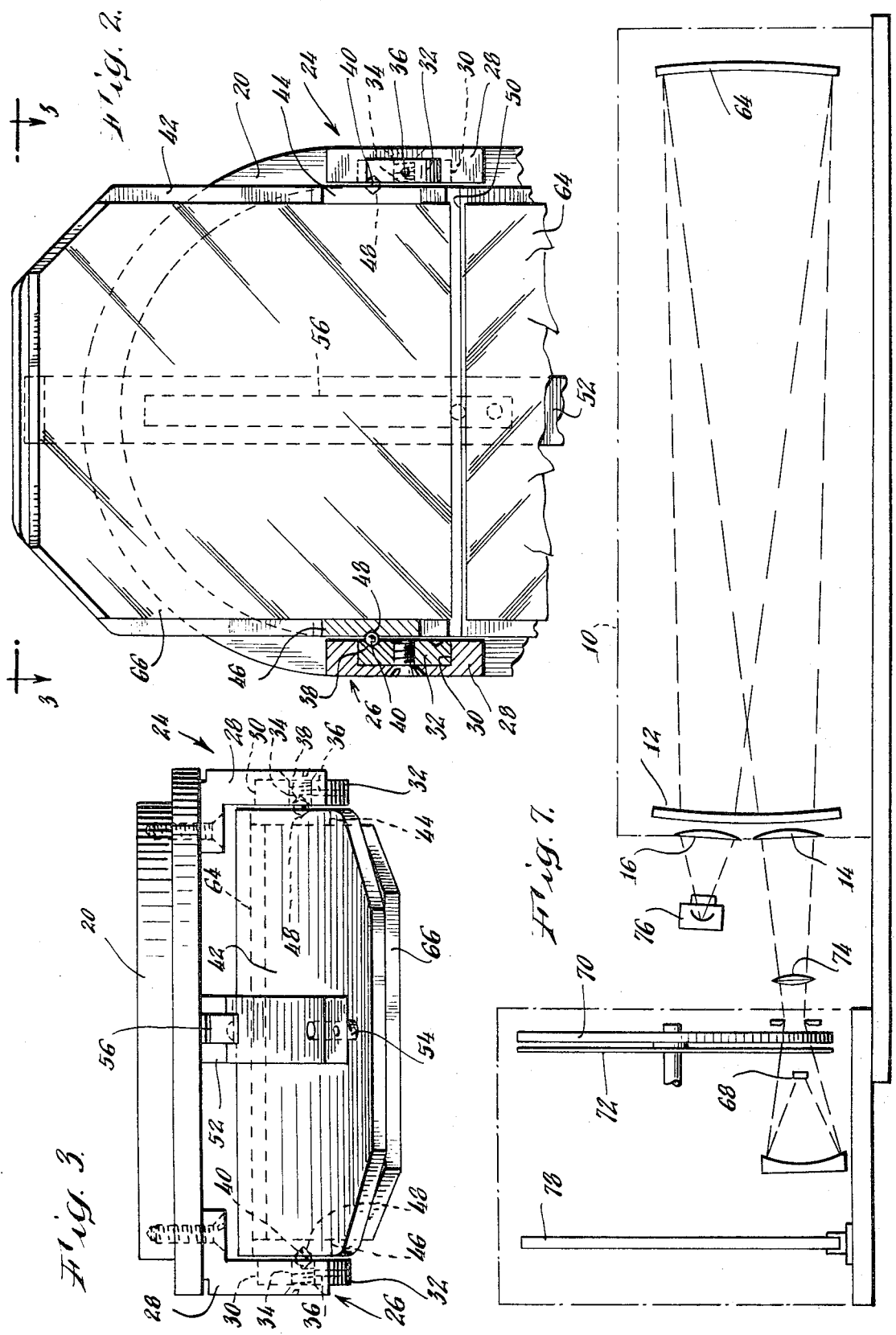

MULTIPLE PASS OPTICAL ABSORPTION CELL

BACKGROUND OF THE INVENTION

It is often desired to measure the absorption spectra of small concentrations of gas or vapor phase components of a sample mixture. Many such applications exist, one of the most common, for example, being found in the field of air pollution measurement and control. For making such measurements, it is common to utilize a spectrometer having as an accessory, or as an integral part thereof, a long path length gas cell. A cell of this type normally comprises an elongated housing having radiation entrance and exit windows and mirrors positioned within to direct the radiation through multiple traversals to give a long effective path length sufficient to obtain the desired absorption.

The traditional multiple reflection cell design was described by John U. White in an article entitled "Long Optical Paths of Large Aperture" appearing at page 285, Vol. 32, of the *Journal of the Optical Society of America* in May, 1942. The basic principle involved the use of three mirrors. A pair of spherical objective mirrors are positioned at one end of the cell and a single spherical field mirror at the other. All mirrors have the same radius of curvature and the separation of the field mirror from the objective mirrors is approximately equal to the radius of curvature. The entrance mirror is positioned at one side of the field mirror and the exit window is positioned at the other side of the same mirror. The objective mirrors are rotatable relative to one another and the overall path length is determined by the spacing between their centers of curvature. The intermediate images formed on the field mirror are positioned along a single horizontal line. The field mirror assures that all the energy of the beam which leaves the first objective mirror returns to the second objective mirror, and vice versa, even for large entrance image sizes. The White design permitted a beam of large optical aperture to be folded many times in a relatively short cell with the main energy loss being due to the mirror surface reflectivity.

An article by T. H. Edwards entitled "Multiple-Traverse Absorption Cell Design" appears at page 98 of Vol. 51, No. 1, *Journal of the Optical Society of America*, Jan. 1961. The article describes a variation of the original White design wherein the entrance and exit windows are positioned above a line passing through the centers of curvature of the objective mirrors. By means of this arrangement, two rows of intermediate images are formed on the field mirror. As pointed out by both White and Edwards, astigmatism is the principle aberration to be expected, due to the substantial off-axis positions of the entrance and exit images. Edwards describes the design parameters contributing to astigmatism and suggests cutting down the field mirror to reduce the distance between the entrance and exit slits.

An article by H. M. Pickett, G. M. Bradley, and H. L. Strauss White "A New with Type Multiple Pass Absorption Cell" appears at page 2,397, Vol. 9, No. 10 of *Applied Optics*, Oct. 1970. This article describes still another variation of the original White system wherein the entrance and exit images are positioned one above the other at one edge of the field mirror. This has the advantage of reducing the minimum path length obtainable to twice the physical length of the cell. In the previously described arrangements, the minimum path length was four times the length of the cell.

In all of the foregoing arrangements, the objective mirrors are rotatable relative to one another and the distance between their centers of curvature on the field mirror determines the number of traversals. Such an arrangement results in a number of disadvantages. For example, such cells have been notorious for difficulties in stability and alignment. This is due to the fact that slight misalignment of the objective mirrors is cumulative and increases with the number of reflections.

As pointed out above, the most serious aberration of the prior art cells is astigmatism. This is due to the substantial off-axis positions of the entrance and exit images with the result that, even for small path lengths, substantially the entire width of the field mirror is employed.

Furthermore, in the prior art designs there is no linear relationship between the rotation of the adjustable objective mirror and the overall path length. This results in difficulty in adjusting the cell for the desired length.

Accordingly it is a primary object of the present invention to provide a multiple path optical absorption cell wherein possible misalignment of the objective mirrors is substantially eliminated.

Another objective is to minimize astigmatism by utilizing only as much of the field mirror width as is required to obtain the path length desired.

Another objective is to provide a cell having a linear relationship between objective mirror rotation and cell path length to thereby simplify adjustment of the cell to the desired path length.

Still other objects, features, and advantages will be apparent from the following description and appended claims.

SUMMARY OF THE INVENTION

The objects of this invention are achieved in a multiple path optical absorption cell of the type including an elongated housing containing two adjacent spherical objective mirrors at one end and a spherical field mirror at the other end with the radiation entrance and exit windows positioned at the same side of the field mirror. The cell is improved by provision of a common mount supporting both of the objective mirrors with their centers of curvature separated a preselected distance. Means are provided for rotating the common mount to move the centers of curvature relative to the field mirror and thereby vary the optical path length through the cell.

BRIEF DESCRIPTION OF THE DRAWINGS

FIG. 1 is a cross sectional plan view of a gas cell constructed in accordance with the present invention;

FIG. 2 is an enlarged illustration of a portion of the objective mirrors and the objective mirror mount taken along the line 2—2 of FIG. 1;

FIG. 3 is an end view of the objective mirrors of FIG. 2 taken along the line 3—3 of FIG. 2;

FIGS. 4–6 are illustrations of the images formed on the field mirror for different rotational positions of the objective mirrors; and FIG. 7 is a schematic elevational view of the cell of this invention in combination with a spectrometer.

DESCRIPTION OF THE PREFERRED EMBODIMENT

With particular reference to FIG. 1, there is illustrated a gas cell in accordance with this invention comprising an elongated housing 10. Internally of this housing, at one end, is mounted a concave spherical field mirror 12. Vertically aligned openings adjacent one edge of the field mirror contain lenses defining an entrance window 14 (FIG. 7) and an exit window 16.

The opposite end of the cell housing defines an opening 18 which is closed by a flanged plate 20 secured by screws 22. Mounted on opposite edges of plate 20 are a pair of L-shaped mounting brackets 24, 26. (FIGS. 2 and 3). The brackets 24, 26 are similar and include spaced, parallel arms 28, each defining a partial circular recess 30 on its inner surface. Mounted within each recess is a disc 32 secured by a screw 34. A portion of each disc protrudes from its recess and defines a radial adjusting hole 36. Defined on the inner surface of each disc is a small depression 38 for retaining a ball bearing 40.

Mounted between the brackets 24, 26 is a mirror mount 42 having upstanding lugs 44, 46. The outer surface of each lug defines a depression 48, each receiving a respective ball bearing 40. Across the face of the mirror mount 42 is a milled slot 50 which slightly weakens the mount 42 to permit a limited hinging action between the two portions of the mount. Secured to one end of the mirror mount, on its back surface, is one end of an angled adjusting bar 52. The other end of the adjusting bar is spaced from the back surface of the mirror mount 42, as shown in FIG. 1, and carries an adjusting screw 54. One end of a leaf spring 56 is secured to the adjusting bar, with its other end bearing against the plate 20.

It will now be apparent that the mirror mount 42 is pivoted between the bearings 40. As viewed in FIG. 1, the spring 56 tends to rotate the mirror mount in a counterclockwise direction against a path length adjustment screw 58. An opening 60 closed by a suitable plug 62 provides access to adjusting screw 54. Secured to the front surface of mirror mount 42 are spherical objective mirrors 64, 66.

FIG. 7 illustrates schematically the gas cell of the invention combined with an infrared spectrometer including a source 68, a filter wheel 70, a chopper 72, an imaging lens 74, a detector 76, and an electronic board 78.

As stated, the field mirror 12 and the objective mirrors 64, 66 are spherical mirrors and all have essentially the same radius of curvature. Furthermore, the field mirror and the objective mirrors are separated by such radius. Referring to FIG. 1, the center of curvature of field mirror 12 is shown as 12c and is located at the juncture of the objective mirrors. The center of curvature 64c of objective mirror 64 and the center of curvature 66c of objective mirror 66 are located on the surface of field mirror 12, a preselected distance apart. It will also be apparent that adjustment of path length adjusting screw 58 will pivot the objective mirrors on their common mount, causing the positions of the centers of curvature 64c, 66c to be selectively positioned along the surface of the field mirror 12. However, the distance between the centers of curvature remains fixed, in contrast to prior art devices.

OPERATION

The operation of the invention will be best understood by reference to FIGS. 1 and 4-6. FIGS. 4-6 illustrate the entrance and exit images, each of which is adjacent to field mirror 12, and the intermediate images which are formed on the field mirror with changes of rotation of the objective mirrors. In these illustrations, the centers of curvature 64c, 66c of the objective mirrors are separated by one-half of the beam image width. Referring first to FIG. 4, the entrance image 1 is illustrated as it would normally be placed adjacent the edge of the field mirror 12. The center of curvature 64c of objective mirror 64 is above, but aligned with, the entrance image. Radiation from the entrance image fills the spherical mirror 64 and is returned to form exit image 2. This position results in the shortest possible path length, which is twice the length of the cell. By advancing path length adjustment screw 58, the centers of curvature may be advanced to the positions illustrated in FIG. 5. In this position, the center of curvature 64c is on the edge of field mirror 12 while center 66c remains one-half the image width to the right. Entrance image 1 is received by the mirror 64 which forms a second image 2 on the field mirror. Image 2 is refocused by mirror 66 to form image 3 which, in turn, is refocused by mirror 64 to form exit image 4. In this arrangement the path length is six times the cell length.

It is important to note that all images are closely packed at the same edge of the field mirror 12. Accordingly, the displacement of the images relative to the axes of the objective mirrors is held to a minimum which results also in minimum astigmatism. This close packing continues with each further adjustment, with only the minimum required width of the field mirror 12 being utilized. FIG. 6, for example, illustrates a more advanced position of the path length adjustment screw to form a total of 20 images on the field mirror 12, the exit image being number 22. At this position the path length is 42 times the length of the cell and it will be noted that the close packing of the images has continued.

The rotational axis of the objective mirrors formed by ball bearings 40 is not centered on the objective mirrors. If it is so centered, image 3 falls off into the entrance aperture when there are a large number of passes, causing a consequent loss of energy. The reason for this is related to the build-up of aberrations in the cell as more images are packed onto the field mirror. By locating the rotation axis off center, a compensating shift in image positions is induced so that the images do not track across the field mirror to any significant extent as path length is changed. The off-center displacement has been empirically determined. In one embodiment wherein the distance between the objective mirrors and field mirror is 375 mm and the width of each objective mirror is 80 mm, the displacement is 12 mm.

By mounting the ball bearing pivots in the discs 32, fine focusing of the images may be obtained. This is accomplished by loosening the screws 34 and inserting a wire or other tool into the holes 36. Rotation of the discs 32 then results in a forward or backward translation of the mirror mount 42 and objective mirrors.

It is also possible to make small adjustments to the angle between the objective mirrors. This is accomplished by inserting a tool through the opening 60 and rotating the adjusting screw 54, causing a change in the angle formed by mount 42 at slot 50. This would not be done during normal operation.

To summarize, the following advantages are obtained with the described invention:

1. Both objective mirrors are held rigidly together. This prevents misalignment of one objective mirror relative to the other, causing errors which accumulate with increased path length. Slight misalignment of the pair of mirrors together, however, is not cumulative.

2. Because both objective mirrors are held together as a unit, there is a linear relationship between the adjusting screw position and cell path length. This is an important practical advantage, as the path length can be read out on a simple counter on the adjusting screw.

3. There is a well defined exit aperture width for all path lengths and, thus, a successful transfer of the beam to the detector. Slight sideways spreading of the image on the field mirror caused by astigmatism does not result in energy loss because the exit aperture remains constant.

4. Because only the width of field mirror required to pack a given number of images is used, the aberrations in the final output image are kept as small as possible.

It will now be apparent that all the objectives of this invention have been obtained by means of the described construction. It will also be apparent that a number of variations and modifications may be made in this invention without departing from its spirit and scope. Accordingly, the foregoing description is to be construed as illustrative only, rather than limiting. This invention is limited only by the scope of the following claims.

We claim:

1. In a multiple pass optical absorption cell of the type including an elongated housing containing first and second adjacent spherical objective mirrors at one end thereof, a spherical field mirror at the other end thereof, and radiation entrance and exit windows at the same side of said field mirror, the improvement which comprises: a common mount supporting both of said objective mirrors with their centers of curvature separated a preselected distance; and means for rotating said mount to move said centers of curvature relative to said field mirror to vary the optical path length through said cell.

2. The improvement of claim 1 wherein said rotating means comprises a pair of aligned pivots displaced from the juncture of said objective mirrors.

3. The improvement of claim 2 wherein each of said pivots is eccentrically mounted in a selectively rotatable disc.

4. The improvement of claim 1 wherein said mount comprises a plate member having a hinge portion substantially at the juncture of said objective mirrors.

5. The improvement of claim 4 wherein said hinge portion is a thinner section of said plate member.

6. The improvement of claim 4 wherein said mount comprises means for adjustably varying the angle formed by said plate member about its hinge portion to adjust said preselected distance.

7. The improvement of claim 6 wherein said varying means comprises: an elongated member having one end fixedly secured to one hinged portion of said plate member and having its other end spaced from the other hinged portion; and adjusting screw means threaded through said other end in engagement with the other hinged portion of said plate member.

8. The improvement of claim 1 wherein said rotating means comprises: means for resiliently urging said mount in a first direction of rotation; and an adjustable stop member limiting said rotation.

9. the improvement of claim 8 wherein said resilient means is a spring.

10. The improvement of claim 8 wherein said stop member is a screw supported in said housing.

* * * * *